(12) United States Patent
Zhang et al.

(10) Patent No.: US 11,050,599 B2
(45) Date of Patent: Jun. 29, 2021

(54) TIMING ADJUSTMENT FREE SOLUTION TO UPLINK SYNCHRONOUS OPERATIONS

(71) Applicant: Huawei Technologies Co., Ltd., Shenzhen (CN)

(72) Inventors: Liqing Zhang, Ottawa (CA); Malte Schellmann, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/713,264

(22) Filed: Sep. 22, 2017

(65) Prior Publication Data

US 2018/0097679 A1 Apr. 5, 2018

Related U.S. Application Data

(60) Provisional application No. 62/402,665, filed on Sep. 30, 2016.

(51) Int. Cl.
*H04L 12/00* (2006.01)
*H04L 27/26* (2006.01)
(Continued)

(52) U.S. Cl.
CPC ...... *H04L 27/2678* (2013.01); *H04L 27/2607* (2013.01); *H04W 56/003* (2013.01);
(Continued)

(58) Field of Classification Search
None
See application file for complete search history.

(56) References Cited

U.S. PATENT DOCUMENTS 8,064,546 B2 11/2011 Jiang et al.
2009/0270122 A1 10/2009 Chmiel et al.
(Continued)

FOREIGN PATENT DOCUMENTS

CN 102986282 A 3/2013

OTHER PUBLICATIONS

3GPP TSG RAN WG1 Meeting #86, "Evaluation on Subcarrier Spacing and CP types for UL Transmission," Huawei, HiSilicon, Gotenburg, Sweden, Aug. 22-26, 2016, 4 pages.

*Primary Examiner* — Noel R Beharry
*Assistant Examiner* — Lionel Preval
(74) *Attorney, Agent, or Firm* — Slater Matsil, LLP (57) ABSTRACT

Uplink synchronization may be achieved without adjusting for timing advance by using longer/larger cyclic prefix durations to compensate for differences in propagation delays, including the cell round-trip delays and environment based multipath delays. In this way, timing advance reference signaling may be omitted from the uplink transmissions. The cyclic prefix duration may be determined based on a characteristic of a base station's coverage area, such as a coverage area size or coverage area type. For example, a longer cyclic prefix length may be used when a base station has a larger coverage area than when the base station has a smaller coverage area. As another example, a different cyclic prefix length may be used for different coverage types. The method provided in this embodiment improves the capabilities of automatic driving and ADAS of electric vehicles. The method can be applied to vehicle networking, such as V2X, LTE-V, V2X, etc.

23 Claims, 4 Drawing Sheets

(51) Int. Cl.
*H04W 56/00* (2009.01)
*H04W 72/04* (2009.01)
*H04W 72/12* (2009.01)

(52) U.S. Cl.
CPC ....... *H04W 56/005* (2013.01); *H04W 72/042* (2013.01); *H04W 72/121* (2013.01); *H04W 72/1268* (2013.01)

(56) References Cited

U.S. PATENT DOCUMENTS

| | | | |
|---|---|---|---|
| 2013/0022090 A1* | 1/2013 | Weng | H04L 25/03343 375/219 |
| 2013/0121315 A1 | 5/2013 | Langereis et al. | |
| 2013/0315321 A1* | 11/2013 | Rajagopal | H04L 27/2607 375/260 |
| 2014/0362801 A1 | 12/2014 | Morita | |
| 2015/0117363 A1* | 4/2015 | Rong | H04B 7/0452 370/329 |
| 2016/0028572 A1 | 1/2016 | Suzuki et al. | |
| 2016/0105863 A1* | 4/2016 | Li | H04W 4/70 370/330 |
| 2016/0149660 A1 | 5/2016 | Seo et al. | |
| 2016/0149743 A1 | 5/2016 | Rong et al. | |
| 2016/0255654 A1* | 9/2016 | Lin | H04W 74/08 370/329 |

\* cited by examiner

TIMING ADJUSTMENT FREE SOLUTION TO UPLINK SYNCHRONOUS OPERATIONS

This application claim priority to U.S. Provisional Application 62/402,665 filed on Sep. 30, 2016 and entitled "Timing Adjustment Free Solution to Uplink Synchronous Operations," which is hereby incorporated by reference herein as if reproduced in its entirety.

TECHNICAL FIELD

The present invention relates to a system and method for wireless communications, and, in particular embodiments, to a system and method for a timing adjustment free solution to uplink synchronous operations.

BACKGROUND

Next-generation wireless networks will need to support diverse traffic types (e.g., voice, data, mobile-gaming), while providing high throughput rates over various, oftentimes changing, channel conditions. To achieve this, network devices may need to have the capability to configure different physical layer parameters on different sets of subcarriers in an efficient, yet scalable, fashion. Moreover, in densely deployed networks that include relatively large numbers of access points, it may be helpful to keep uplink communication signals synchronized in cells with different coverage area characteristics (e.g., coverage area size, cell radius, etc.) to improve overall network performance; for example, uplink synchronous operations are beneficial to signal detection and reception in OFDM based network.

SUMMARY OF THE INVENTION

Technical advantages are generally achieved by embodiments of this disclosure which describe techniques for a timing adjustment free solution to uplink synchronous operations.

In accordance with an embodiment, a method for performing uplink transmissions is provided. In this embodiment, the method includes receiving a downlink configuration instruction from a base station that indicates a cyclic prefix length, and performing an uplink transmission without adjusting a timing advance. The uplink transmission carries a cyclic prefix having the cyclic prefix length indicated by the downlink configuration instruction received from the base station. In one example, the method further includes selecting from multiple resources a resource over which to perform the uplink transmission based on a cyclic prefix length associated with the resource. In that example, or in another example, the UE is in an idle or inactive state prior to performing the uplink transmission, and a resource over which the uplink transmission is performed is configured associated with the cyclic prefix length, where the resource is configured to carry uplink information transmissions of UEs transitioning from the idle or inactive state to an active state. In any of the above-mentioned examples, or in another example, a resource over which the uplink transmission is performed is associated with the cyclic prefix length, the cyclic prefix length being configured to carry timing advance (TA) free uplink transmissions. In any of the above-mentioned examples, or in another example, the downlink configuration instruction associates a different cyclic prefix length with resources configured to carry uplink transmissions by UEs in an active state than with resources configured to carry timing advance (TA) free uplink transmissions by UEs in an idle or inactive state. In any of the above-mentioned examples, or in another example, the downlink configuration instruction is a broadcast or multicast message associated with a particular group of UEs. In any of the above-mentioned examples, or in another example, the method further includes selecting the cyclic prefix length based on an absolute or relative location of the UE within a serving cell. In any of the abovementioned examples, or in another example, the uplink transmission does not include timing advance reference signaling. An apparatus for performing this method is also provided.

In accordance with another embodiment, a method for synchronizing uplink transmissions is provided. In this embodiment, the method further includes sending, to one or more user equipments (UEs), an instruction instructing the one or more UEs to transmit uplink transmissions in accordance with a cyclic prefix length, and receiving, from the one or more UEs, one or more uplink transmissions carrying a cyclic prefix having the cyclic prefix length. The cyclic prefix length is selected such that the uplink transmissions are communicated without adjusting a timing advance to compensate for different propagation delays between UEs and the base station. In one example, repeated timing advance reference signaling is omitted from the uplink transmissions. In that example, or in another example, the cyclic prefix length is based on a characteristic of a coverage area of the base station. In such an example, the characteristic of the coverage area may include a coverage area size, and the instruction may indicate a longer cyclic prefix length when the base station has a larger coverage area than when the base station has a smaller coverage area. Additionally or alternatively, in such an example, the characteristic of the coverage area may comprise a multi-path time delay in the coverage area, and the instruction may indicate a longer cyclic prefix length when the coverage area has a larger multi-path time delay than when the coverage area has a smaller multi-path time delay. In any one of the abovementioned examples, or in another example, the instruction may be carried in a broadcast or multicast message associated with a particular group of UEs. In any one of the above-mentioned examples, or in another example, the instruction may be carried in a radio resource control (RRC) message. In such an example, the instruction may semi-statically instruct the one or more UEs to transmit uplink transmissions in accordance with the cyclic prefix length for a predetermined amount of time or until a subsequence instruction that indicates a different cyclic prefix length is received. In any one of the abovementioned examples, or in another example, the instruction is carried in downlink control indication (DCI) message. In such an example, the instruction may dynamically instruct the one or more UEs to transmit uplink transmissions in accordance with the cyclic prefix length for a specific resource. An apparatus for performing this method is also provided.

In accordance with another embodiment, another method for synchronizing uplink transmissions is provided. In this example, the method includes sending, to one or more user equipments (UEs), an instruction instructing the one or more UEs to transmit uplink transmissions in accordance with a cyclic prefix length, and receiving, from the one or more UEs, one or more uplink transmissions carrying a cyclic prefix having the cyclic prefix length. The cyclic prefix length is based on a characteristic of a coverage area of the base station. In one example, the characteristic of the coverage area comprises at least one of: a traffic type in the coverage area; and a coverage area type. In such an example, the coverage area type may be one of an urban coverage area, a suburban coverage area, and a rural coverage area. In such an example, the instruction may indicate a different cyclic prefix length when the coverage area of the base station is an urban coverage area than when the coverage area of the base station is a suburban coverage area, the instruction may indicate a different cyclic prefix length when the coverage area of the base station is an urban coverage area than when the coverage area of the base station is a rural coverage area, and/or the instruction may indicate a different cyclic prefix length when the coverage area of the base station is a suburban coverage area than when the coverage area of the base station is a rural coverage area. In any one of the abovementioned examples, or in another example, the method may further include adjusting the characteristic of the coverage area, determining an updated cyclic prefix length based on the adjusted characteristic of the coverage area, sending an updated instruction to at least one of the one or more UEs that instructs the at least one UE to transmit uplink transmissions in accordance with the updated cyclic prefix length, and receiving a subsequent uplink transmission from the at least one UE that carries a cyclic prefix with the updated cyclic prefix length. In such an example, the characteristic of the coverage area may include a round-trip time delay in the coverage area, and the instruction may indicate a longer cyclic prefix length when the coverage area has a larger round-trip time delay than when the coverage area has a smaller round-trip time delay. An apparatus for performing this method is also provided.

BRIEF DESCRIPTION OF THE DRAWINGS

For a more complete understanding of the present invention, and the advantages thereof, reference is now made to the following description taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

User equipments (UEs) that have data to transmit to a base station typically listen to downlink signals received from the base station, and use the timing of the downlink transmissions to determine when to transmit their data. However, this determination does not account for the round-trip delay for signals to propagate between the base station and the UE. As a result, an uplink transmission from a UE to the base station will arrive at a different time depending on the UE's distance from the base station, resulting in interference. Additional interference can be caused by multi-path propagation between the UE and the base station, typically caused by environmental factors such as reflections from surfaces, resulting in multiple instances of the same transmission arriving at different times.

Synchronizing uplink transmissions from different UEs serves to mitigate the interference attributable to round-trip delays and multi-path propagation. In general, uplink transmissions of different UEs are considered synchronized when cyclic prefixes of the respective uplink transmissions at least partially overlap in the time domain within a certain range (such as a cyclic prefix duration) upon arrival at the base station.

One technique for achieving uplink synchronization is to adjust a timing advance of the uplink transmissions based on a propagation delay of the respective channel. In conventional networks, when a UE is operating in an idle state (or an idle-like state), timing advance is determined at the eNB during the state transition from Idle to Active/RRC connected state based on timing advance reference signaling (e.g., preamble) transmitted from the UE to the base station. Moreover, there is a TA timer for a UE, and when the timer expires, the UE has to do the re-synchronization with the network using, e.g., PRACH channel with a preamble, assumed that the UL synchronization can't be potentially maintained due to the mobility after a period of the timer. In other words, each UE may need to periodically (in terms of a timer period) do the (UL) re-synchronization with the network in current LTE system. The timing advance reference signaling constitutes overhead in the uplink channel with respect to data traffic. By way of example, in fourth generation (4G) Long Term Evolution (LTE) networks, timing advance reference signaling using a preamble adds approximately one resource block (RB) of overhead to the uplink channel. For devices that transmit infrequent small packets, this overhead can be comparable to the size of the transmitted data.

Aspects of this disclosure achieve uplink synchronization by using longer/larger cyclic prefix durations to compensate for differences in propagation delays, including the cell round-trip delays and environment based multipath delays, which allow uplink transmissions to be synchronized without adjusting timing advance. In this way, timing advance reference signaling may be omitted from the uplink transmissions. It should be appreciated that the terms "longer CP" and "larger CP" are used interchangeably herein. In some embodiments, the cyclic prefix duration is determined based on a characteristic of a base station's coverage area, such as a coverage area size or coverage area type. For example, a longer cyclic prefix length may be used when a base station has a larger coverage area than when the base station has a smaller coverage area. As another example, a different cyclic prefix length may be used for different coverage types. Coverage area types may include an urban coverage area, a suburban coverage area, and a rural coverage area. In some embodiments, the characteristic of the base station's coverage area may be adjusted dynamically, and the cyclic prefix length may be updated based on the adjusted coverage area characteristic. As used herein, the term "TA free transmission" refers to a transmission that was performed without updating timing advance parameters using a PRACH procedure (e.g., without exchanging a PRACH preamble and PRACH response with a base station). By extension, a resource for TA free transmission refers to a resource that is assigned, or otherwise associated with, an appropriate length CP to provide UL synchronism without relying on a PRACH procedure. The length of the CP may be dependent on various criteria, such as the cell size and whether or not environment based multipath delays need to be accounted/ compensated for. Moreover, UE(s) may receive TA-free configuration information, including (but not limited to) resources configured with larger CPs for TA-free transmission, from the base station(s) when the UE(s) is (are) doing a network entry, connection setup or during the data transmissions, either semi-statically or dynamically, by broadcast, multi-cast (e.g., group common PDCCH), RRC and/or DCI signaling.

Upon entering a network or cell, a UE may generally perform UL and/or DL synchronization to align the UE's frequency, phase, and/or timing settings with that of the base station. As a result, the UE may generally achieve initial UL and DL synchronization during the network entry and/or connection set-up, and may maintain the resulting DL and UL synchronization parameters, including the initial TA timing value, during the communications session.

A UE's operation mode may define whether a UE is required to update DL and/or UL synchronization parameters prior to performing a data transmission. In particular, a UE that is operating in "operation mode (a)" will generally be required to update its DL synchronization parameters prior to performing a transmission. The DL synchronization parameters may be updated based on DL reference signal(s) before each burst packet transmission by the UE. The UE may update the prior DL synchronization parameters to compensate for changes in DL propagation characteristics. After updating the DL synchronization parameter, the UE may perform an UL transmission UL timing based on the updated DL synchronization parameters and the previously stored UL synchronization parameters without having to exchange PRACH signaling. However, because the UL synchronization parameters are less accurate than they would otherwise have been had a PRACH procedure been performed, a UE operating in operation mode (a) may need to use a longer CP to account for differences in the UL propagation delay of the UE and other UEs transmitting uplink signals to the base station. A UE that is operating in "operation mode (b)" is generally not required to update DL and UL synchronization parameters prior to performing an uplink transmission. In this operation mode, an even longer CP may be used to account for both the DL and UL propagation delays between the UE and base station. Network components (e.g., base stations, etc.) may configure a given UE to operate in either "operation mode (a)" or "operation mode (b)" via broadcast, RRC, multicast and/or L1 signaling. A selection of CP length or numerology by a network component may use a reference look-up tables such as Tables 1-6 taking into account several factors such as the cell coverage area size, multiple environments/multiple path delay spreads, and UE operation mode type. These and other aspects are discussed in greater detail below.

Figure 1:
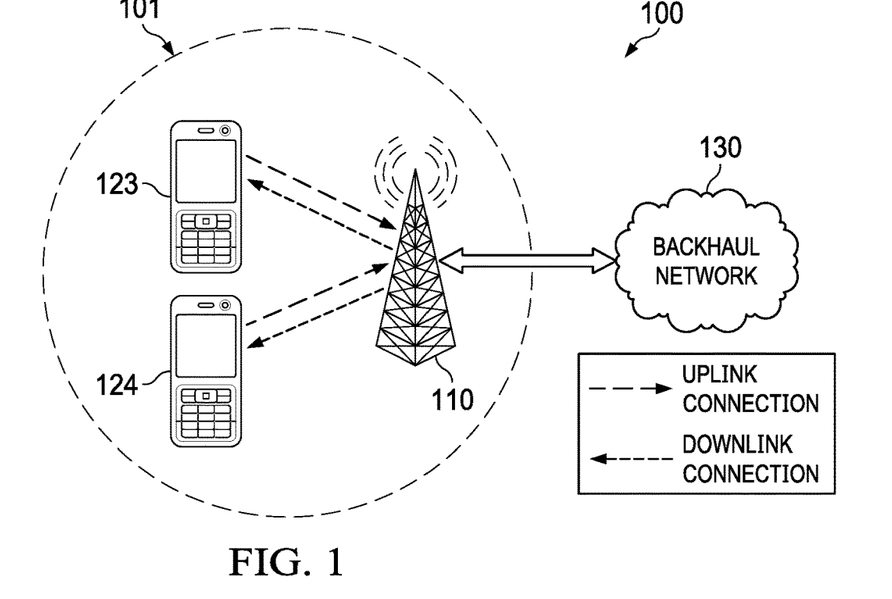
FIG. 1 is a diagram of an embodiment wireless network.

FIG. 1 is a diagram a wireless network 100 for communicating data. The wireless network 100 includes a base station 110 which has a coverage area 101, user equipments (UEs) 123, 124, and a backhaul network 130. The base station 110 may comprise any component capable of providing wireless access by, among other things, establishing uplink (dashed line) and/or downlink (dotted line) connections with the UEs 123, 124. For instance, the base station 110 may be an evolved Node B (eNB), a femtocell, a Wi-Fi AP, and other devices capable of providing wireless access to the UEs 123, 124. The UEs 123, 124 may comprise any component capable of establishing a wireless connection with the base station 110. The backhaul network 130 may be any component or collection of components that allow data to be exchanged between the base station 110 and a remote end. In some embodiments, there may be multiple such networks, and/or the network may comprise various other wireless devices, such as relays, low power nodes, etc.

Figure 2:
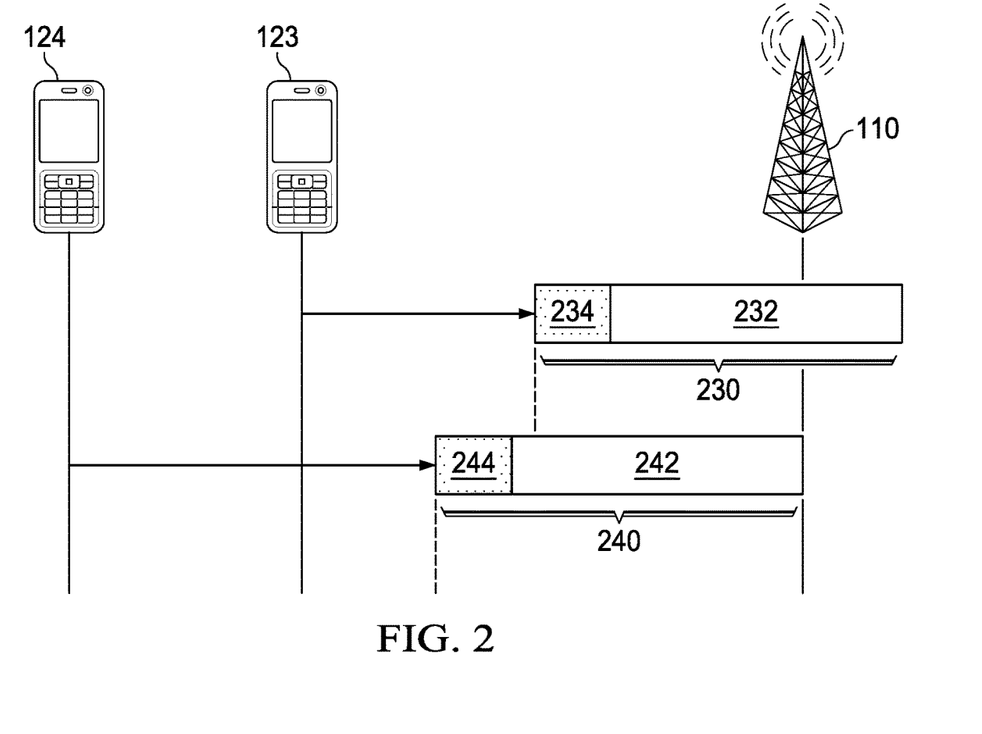
FIG. 2 is a diagram of unsynchronized uplink transmissions.

As discussed above, uplink transmissions that are not synchronized may experience significant interference as a result of multi-path propagation. Uplink transmissions are not synchronized when their respective cyclic prefixes due not overlap in the time domain upon arrival at the base station. FIG. 2 is a diagram of unsynchronized uplink transmissions transmitted from the UEs 123, 124 to the base station 110. In particular, the UE 123 communicates an uplink transmission 230 to the base station 110, and the UE 124 communicates an uplink transmission 240 to the base station 110. The uplink transmission 230 includes a useful symbol portion 232 and a cyclic prefix 234, and the uplink transmission 240 includes a useful symbol portion 242 and a cyclic prefix 244.

The uplink transmissions 230, 240 are transmitted by the UEs 123, 124 at approximately the same time. The UE 123 is located closer to the base station 110 than the UE 124. As a result, the uplink transmission 230 experiences a lower propagation delay than the uplink transmission 240, which causes the uplink transmission 230 to arrive at the base station 110 prior to the uplink transmission 240. In this example, the difference in arrival times exceeds a cyclic prefix duration of the uplink transmission 230. Consequently, the cyclic prefixes 234, 244 do not overlap in the time domain, and the uplink transmissions 230, 240 are not synchronized with each other.

Figure 3:
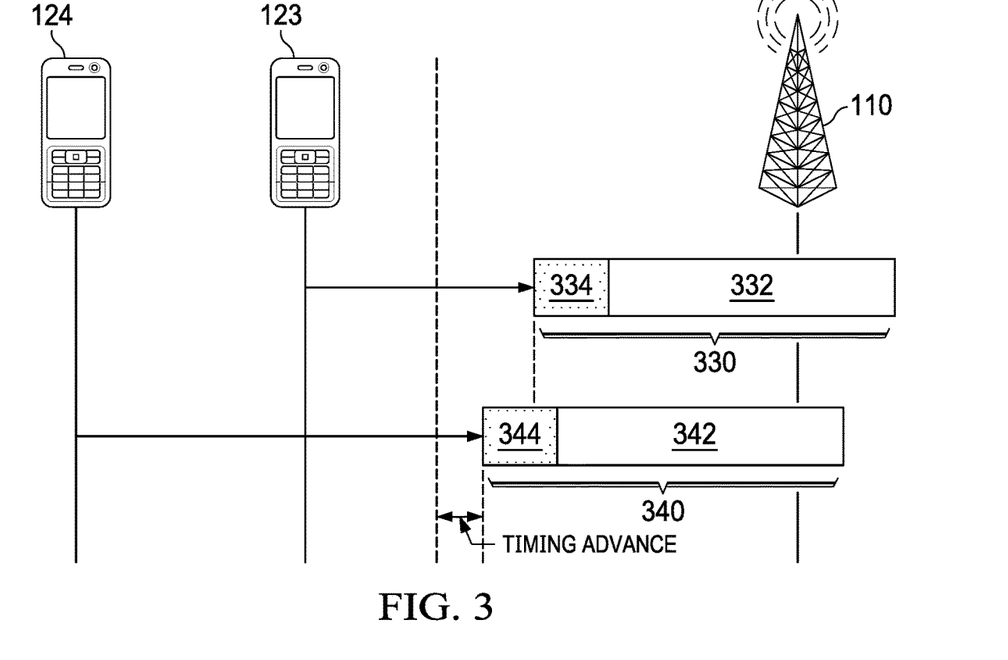
FIG. 3 is a diagram of a conventional scheme for synchronized uplink transmissions.

A conventional way to synchronize uplink transmissions is to use a timing adjustment to compensate for differences in propagation delay. FIG. 3 is a diagram of synchronized uplink transmissions transmitted from the UEs 123, 124 to the base station 110. In this example, the UE 123 communicates an uplink transmission 330 to the base station 110, and the UE 124 communicates an uplink transmission 340 to the base station 110. Similar to the uplink transmissions 230, 240 (discussed above), the uplink transmissions 330, 340 include useful symbol portions 332, 342 (respectively) and cyclic prefixes 334, 344 (respectively). However, unlike the uplink transmissions 230, 240, the uplink transmissions 330, 340 are synchronized by transmitting the uplink transmissions 340 in accordance with a timing advance. In general, the timing advance causes the uplink transmission 340 to be transmitted slightly earlier than the uplink transmission 330 to compensate for the difference in propagation delay between the UEs 123, 124 and the base station 110.

Although timing advance is a relatively reliable way of achieving uplink synchronization, it nevertheless requires that timing advance reference signaling be included in the uplink transmission. This can be an unsatisfactory solution for small uplink transmissions (e.g., one or a few symbols), because the overhead required for timing advance reference signaling can be comparable to the size of the uplink transmission. By way of example, an uplink transmission carrying symbols that span ten resource blocks (RBs) may require the same amount of timing advance reference signaling (e.g., one RB of overhead) as a an uplink transmission carrying symbols that span one RB. As such, using timing advance adjustments to compensate for propagation delay may be impractical for uplink transmissions with small payloads.

Figure 4:
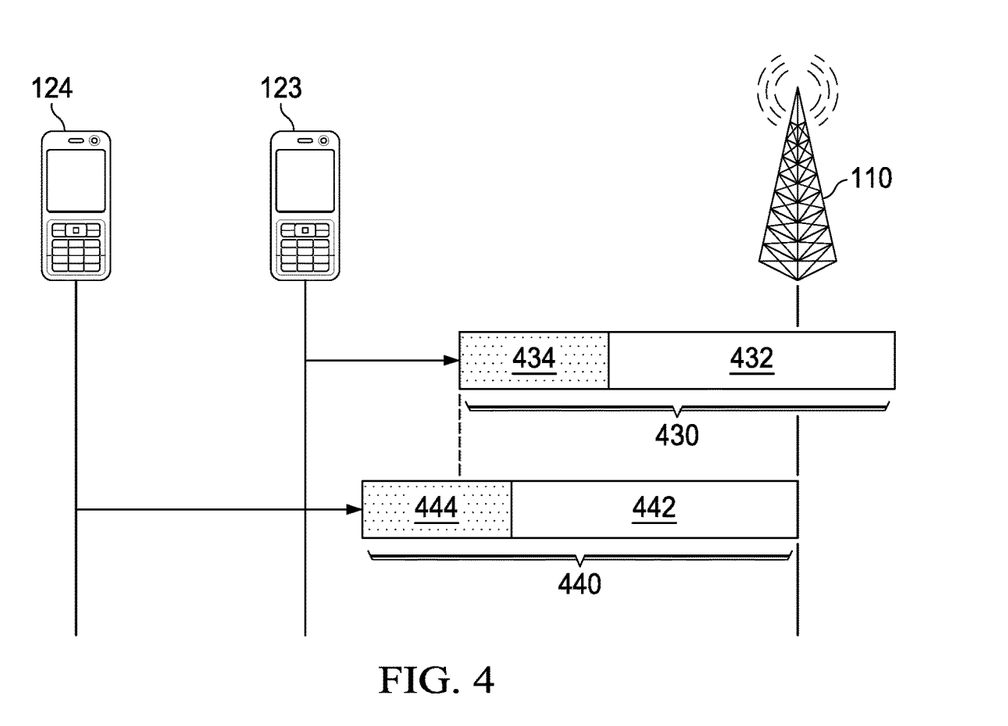
FIG. 4 is a diagram of an embodiment scheme for synchronized uplink transmissions.

Aspects of this disclosure achieve uplink synchronization without adjusting for timing advance by using cyclic prefix durations that are long enough to compensate for differences in propagation delay. FIG. 4 is a diagram of synchronized uplink transmissions from the UEs 123, 124 to the base station 110. Similar to the uplink transmissions 330, 340, the uplink transmissions 430, 440 include useful symbol portions 432, 442 (respectively) and cyclic prefixes 434, 444 (respectively). However, the cyclic prefixes 434, 444 have duration (or cyclic prefix length) that is sufficient to compensate for the difference in propagation delay between the UEs 123, 124 and the base station 110. As a result, the uplink transmissions 430, 440 are synchronized without adjusting for timing advance, which means that timing advance reference signaling can be omitted from the uplink transmissions 430, 440, thereby reducing overhead. It should be appreciated that the additional overhead attributable to the extended cyclic prefix durations in the uplink transmissions 430, 440 may be less than the overhead associated with timing advance reference signaling when the symbol duration of the uplink transmissions 430, 440 is short enough (e.g., below a threshold) and/or when the maximum propagation delay in the coverage area of the base station 110 is low enough (e.g., below a threshold).

Figure 5:
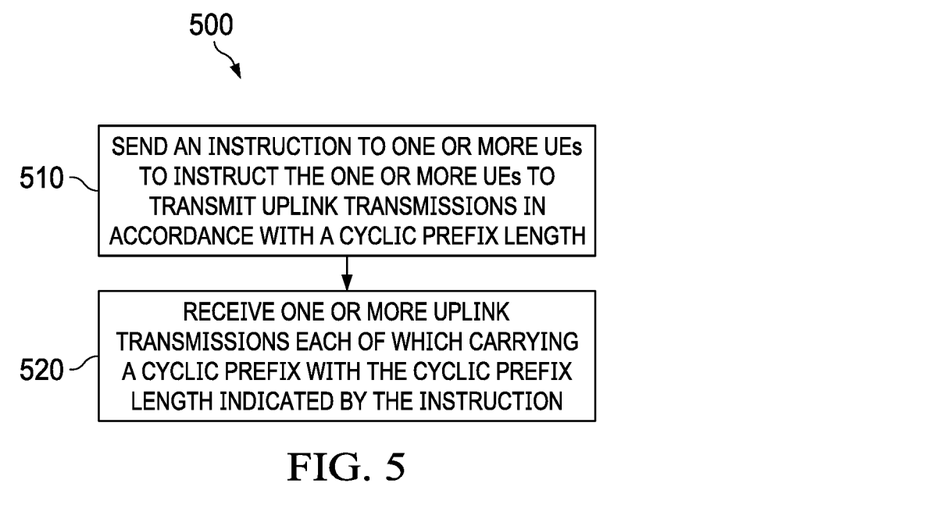
FIG. 5 is a flowchart of an embodiment method for synchronizing uplink transmissions.

FIG. 5 is a flowchart 500 of a method for synchronizing uplink transmissions, as may be performed by a base station. At step 510, the base station sends an instruction to one or more UEs to instruct the one or more UEs to transmit uplink transmissions in accordance with a cyclic prefix length. At step 520, the base station receives one or more uplink transmissions each of which carrying a cyclic prefix having the cyclic prefix length indicated by the instruction. The cyclic prefix length may be selected such that the uplink transmissions are communicated without adjusting a timing advance to compensate for different propagation delays between UEs and the base station. In some embodiments, the cyclic prefix length is selected based on a characteristic of a coverage area of the base station. In one example, the cyclic prefix length is based on a coverage area size such that the instruction indicates a longer cyclic prefix length when the base station has a larger coverage area than when the base station has a smaller coverage area. In another example, the cyclic prefix length is based on a multi-path time delay associated with the coverage area such that the instruction indicates a longer cyclic prefix length when the coverage area has a larger multi-path time delay than when the coverage area has a smaller multi-path time delay. In yet another example, the cyclic prefix length is based on a traffic type in the coverage area. In yet another example, the cyclic prefix length is based on a coverage area type. In such an example, the instructions may indicate different CP lengths for urban, suburban, and rural coverage areas. For instance, the instruction may indicate a different cyclic prefix length when the coverage area of the base station is an urban coverage area than when the coverage area of the base station is a suburban coverage area. Additionally or alternatively, the instruction may indicate a different cyclic prefix length when the coverage area of the base station is an urban coverage area than when the coverage area of the base station is a rural coverage area. Additionally or alternatively, the instruction may indicate a different cyclic prefix length when the coverage area of the base station is a suburban coverage area than when the coverage area of the base station is a rural coverage area.

In an embodiment, the method 500 further comprises one or more of the following steps: adjusting the characteristic of the coverage area; determining an updated cyclic prefix length based on the adjusted characteristic of the coverage area; sending an updated instruction to at least one of the one or more UEs that instructs the at least one UE to transmit uplink transmissions in accordance with the updated cyclic prefix length; and receiving a subsequent uplink transmission from the at least one UE, the updated uplink transmission carrying a cyclic prefix with the updated cyclic prefix length.

Figure 6:
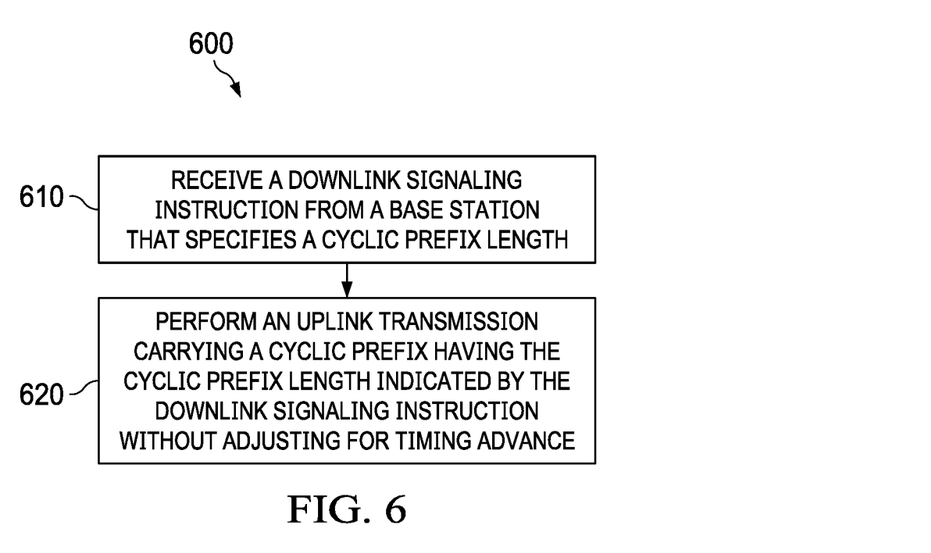
FIG. 6 is a flowchart of an embodiment method for performing an uplink transmission.

FIG. 6 is a flowchart of a method 600 for performing a synchronizing uplink transmission, as may be performed by a UE. At step 610, the UE receives an instruction from a base station that specifies a cyclic prefix length. At step 620, the UE performs an uplink transmission carrying a cyclic prefix that has the cyclic prefix length indicated by the downlink signaling instruction. The uplink transmission is performed without adjusting for timing advance. In some embodiments, the instruction is carried in an RRC message. In such embodiments, the instruction may semi-statically instruct the one or more UEs to transmit uplink transmissions in accordance with the cyclic prefix length for a predetermined amount of time or until a subsequence instruction that indicates a different cyclic prefix length is received. In other embodiments, the instruction is carried in downlink control indication (DCI) message. In such embodiments, the instruction may dynamically instructs the one or more UEs to transmit uplink transmissions in accordance with the cyclic prefix length for a specific resource.

In general, UEs may operate in an active state, or in an energy-saving state with limited connectivity to the network. When operating in an active state, the UE may actively (e.g., continuously, periodically, etc.) perform uplink transmissions, which may allow timing advance adjustments by the base station to be determined based on the data transmissions without relying on separate timing advance control signaling such as PRACH process with a preamble in UL. When operating in the energy-saving state, the UE may transmit data less often (e.g., discontinuously, aperiodically, sporadically, etc.), and as a result, the UE may need to occasionally transmit timing advance signaling in order for the base station to determine the appropriate timing advance adjustments for uplink synchronization in a typical LTE network. The timing advance signaling may be transmitted in a preamble with, or without, an accompanying data transmission, and may increase signaling overhead in the uplink channel, as well as increase the UE's energy consumption. The overhead attributable to timing advance signaling may be significant when it is associated with a small packet transmission. Accordingly, techniques for achieving uplink synchronization without having to adjust for timing advance may reduce overhead in small traffic transmissions for UEs operating in an energy-saving state.

For a given numerology such as 15 kHz subcarrier spacing, transmissions using normal cyclic prefix (NCP) durations have an overhead of approximately 6.67%, and transmissions using extended cyclic prefix (ECP) durations same as LTE have an overhead of approximately 20%. From this, it can be seen that using the ECP duration increases the overhead by less than 13%. The overhead of using the ECP to replace repeated TA timing for keeping UL synchronized in certain conditions is much less than the signaling overhead associated with timing advance signaling procedures, which can approach 100% overhead (e.g., roughly 1:1 relationship between overhead and data traffic loading).

Traffic types and applications may determine which numerologies to use. For example, machine-type communications (MTC) may use 3.75 kHz subcarrier spacings, and enhanced mobile broadband (eMBB) may use 15 kHz subcarrier spacings. For a given numerology, a base station may configure a cyclic prefix type (or cyclic prefix length) based on eNB service area.

Extended cyclic prefix lengths may be used to compensate for round trip delay and/or delay spreads in order to maintain uplink synchronization. This may reduce overhead, latency, and energy consumption.

Embodiments of this disclosure provide an embodiment scheme for determining how to choose a numerology (i.e. subcarrier spacing, etc.) based on, for example, traffic types and application parameters/characteristics, as well as how to select a cyclic prefix length based on, for example, a characteristic of the base stations coverage area.

In an embodiment, an adaptive scheme may be used to select a cyclic prefix length for a given sub-carrier spacing example, each of different BWPs can be configured resource(s) with a different CP length, to keep a different coverage and maintain UL synchronism over a different cell size With each BWP, different resources with different CP lengths can be configured in TDM and/or FDM multiplexing. Moreover, the above resource configurations with different CP lengths apply to both FDD and TDD mode operations.

Symbols transmitted over different sub-carrier spacings, and/or according to different "CP types," may exhibit different CP lengths. In general, CP overhead is a ratio of the CP length to the OFDM symbol duration, which is the sum of the useful OFDM symbol duration and the CP length (i.e., CP length/(Useful Symbol Duration+CP length). Table 1 provides examples CP lengths for different combinations of sub-carrier spacings and CP types, which also shows the relationship among useful OFDM duration, a CP length and OFDM symbol duration.

TABLE 1

| SCS (kHz) | Useful OFDM symbol duration T_useful (us) | (larger) CP length (us) | | | OFDM symbol duration (us) * | | |
|---|---|---|---|---|---|---|---|
| | | CP Type A | CP Type B | CP Type C | CP Type A | CP Type B | CP Type C |
| 3.75 | 266.7 | 66.7 | 233.3 | 333.3 | 333.3 | 500.0 | 600.0 |
| 7.5 | 133.3 | 33.3 | 116.7 | 166.7 | 166.7 | 250.0 | 300.0 |
| 15 | 66.7 | 16.7 | 58.3 | 83.3 | 83.3 | 125.0 | 150.0 |
| 30 | 33.3 | 8.3 | 29.2 | 41.7 | 41.7 | 62.5 | 75.0 |
| 60 | 16.7 | 4.2 | 14.6 | 20.8 | 20.8 | 31.3 | 37.5 |
| 120 | 8.3 | 2.1 | 7.3 | 10.4 | 10.4 | 15.6 | 18.8 |
| 240 | 4.2 | 1.0 | 3.6 | 5.2 | 5.2 | 7.8 | 9.4 |
| 480 | 2.1 | 0.5 | 1.8 | 2.6 | 2.6 | 3.9 | 4.7 |
| CP Overhead [CP/(CP + T_useful)] | | 20.0% | 46.7% | 55.6% | 20.0% | 46.7% | 55.6% | based on deployment scenarios, traffic types and applications. The cyclic prefix length may be transmitted through a UE specific control channel such as RRC signaling and UE specific DCI. Alternatively, the cyclic prefix length may be broadcast to all UEs being served by the base station, or multi-cast to a subset of UEs served by the base station such as group common PDCCH.

In some embodiments, a resource configuration for supporting UL TA-free transmissions includes one or more PRACH channels and one or more TA-free resource areas. The TA-free resource areas may support grant-based and/or grant-free transmissions. Each of the TA-free resource areas may be associated with different CP-lengths, where the minimum resource area can consist of one resource. The resource configuration may be dynamically and/or semi-statically configured via any type of signaling from a base station, including multi-cast messages, radio resources control (RRC) messages, and/or downlink control information (DCI) messages (e.g., UE-specific DCI messages, group-specific DCI messages, etc.). In some embodiments, UEs may select one of the available TA-free resource areas based on a pre-defined/preconfigured selection rule, e.g., based on cell size, etc. A UE may transmit data over a TA-free resource area when the UE is in an inactive state, as well as when the UE is in an idle period (e.g., an RRC dis-connected state) or a discontinued reception (DRX) off period of an active (or RRC connected) state. A resource configuration for supporting UL TA-free transmissions may span one or more bandwidth parts (BWPs) of a component carrier. For Moreover, different combinations of sub-carrier spacings and CP types may provide synchronization for different size cells. When UEs are configured with Operation Mode (a), e.g., when the UE's downlink (DL) synchronization parameters are up to date, Tables 2 and 3 can be used as reference values by the base station to configure one or more resources with larger CP(s) for UE uplink (UL) TA free transmissions, e.g., the UE UL transmissions in time/frequency resources with the larger CP(s) will be able to guarantee UE signals synchronized at the base station in specified cell sizes provided in the tables. Table 2 indicates cell sizes for different combinations of sub-carrier spacings and CP types that are capable of providing uplink synchronization for the given sub-carrier spacing when the CP does not accommodate for other variables (e.g., multipath spread delay in a propagation environment is very small that can be neglected in impacting UL synchronization behavior, etc.), and Table 3 indicates cell sizes for different combinations of sub-carrier spacings and underlying CP types that are capable of providing the uplink synchronization for the given sub-carrier spacing when the CP is required to include an additional 2 us to accommodate for other variables such as multiple delay spread, thereby leaving less of the CP length to account for the UL propagation delay.

TABLE 2

Cell Radius (km) covered by CP to keep UL synchronized
With DL synchronized/no CP for other uses

| SCS (kHz) | CP Type-A | CP Type-B | CP Type-C |
|---|---|---|---|
| 3.75 | 20.0 | 70.0 | 100.0 |
| 7.5 | 10.0 | 35.0 | 50.0 |
| 15 | 5.0 | 17.5 | 25.0 |
| 30 | 2.5 | 8.8 | 12.5 |
| 60 | 1.3 | 4.4 | 6.3 |
| CP overhead | 20% | 46.7% | 56% |

TABLE 3

Cell Radius (km) covered by CP to keep UL synchronized
With DL synchronized/e.g, 2 us CP for other uses

| SCS (kHz) | CP Type-A | CP Type-B | CP Type-C |
|---|---|---|---|
| 3.75 | 19.4 | 69.4 | 99.4 |
| 7.5 | 9.4 | 34.4 | 49.4 |
| 15 | 4.4 | 16.9 | 24.4 |
| 30 | 1.9 | 8.2 | 11.9 |
| 60 | 0.7 | 3.8 | 5.7 |
| CP overhead | 20% | 46.7% | 56% |

In some instances, for example, UEs are configured in Operation Mode (b) such that the CP length is required to account for both uplink and downlink propagation delays. Tables 4 and 5 can be used as reference values by the base station to configure one or more resources with larger CP(s) for UE UL TA free transmissions, i.e., the UL transmissions in time/frequency resources with the larger CP(s) will be able to guarantee UE signals synchronized at the base station in specified cell sizes provided in the tables. Table 4 indicates cell sizes for different combinations of sub-carrier spacings and underlying CP types that are able to provide both downlink and uplink synchronization when other variables (e.g., multipath spread delay) do significantly impact synchronizations, such as in a case where a propagation environment is relatively small, and Table 5 indicates cell sizes for different combinations of sub-carrier spacings and underlying CP types that are able to provide the downlink and uplink synchronization, where other variables such as multiple delay spread are considered to take 2 us period from the entire CP length (thus leaving less CP length to account for both downlink and uplink propagation delays).

TABLE 4

Cell Radius (km) covered by CP to keep UL synchronized
NO DL synchronized/no CP for other uses

| SCS (kHz) | CP Type-A | CP Type-B | CP Type-C |
|---|---|---|---|
| 3.75 | 10.0 | 35.0 | 50.0 |
| 7.5 | 5.0 | 17.5 | 25.0 |
| 15 | 2.5 | 8.8 | 12.5 |
| 30 | 1.3 | 4.4 | 6.3 |
| 60 | 0.6 | 2.2 | 3.1 |
| CP overhead | 20% | 46.7% | 56% |

TABLE 5

Cell Radius (km) covered by CP to keep UL synchronized
NO DL synchronized/e.g., 2 us CP for other uses

| SCS (kHz) | CP Type-A | CP Type-B | CP Type-C |
|---|---|---|---|
| 3.75 | 9.4 | 34.4 | 49.4 |
| 7.5 | 4.4 | 16.9 | 24.4 |

TABLE 5-continued

Cell Radius (km) covered by CP to keep UL synchronized
NO DL synchronized/e.g., 2 us CP for other uses

| SCS (kHz) | CP Type-A | CP Type-B | CP Type-C |
|---|---|---|---|
| 15 | 1.9 | 8.2 | 11.9 |
| 30 | 0.7 | 3.8 | 5.7 |
| 60 | 0.025 | 1.6 | 2.5 |
| CP overhead | 20% | 46.7% | 56% |

In an embodiment, one or more UEs can be configured to use one or more (e.g., time/frequency) resources with NCP and/or different length(s) of larger CP(s) (e.g., Type-A and Type-B). A UE may choose one or more of these resources for its UL data transmissions based on a rule, e.g., randomly choosing. The rule may be used to select both a resource over which to perform an uplink transmission and a cyclic prefix length to use for the uplink transmission. The rule may be preconfigured/predefined to fit the UE's traffic loading and/or TA free transmission characteristics. For example, one or more UEs (e.g., a group of UEs) can be configured to use the resources associated with larger CP(s) for TA free transmissions (e.g., as may be equivalent to setting a TA timer in a 4G LTE network) if applicable to the future network, to a big value or even infinite); another example is that one or a group of UEs can be configured to use the configured resources with larger CP(s) for specific applications such as small packet low latency traffic, or special propagation environments such as in a express train. This UE configuration and associated behavior may apply to UE active state, Inactive and Idle state, where in either Inactive or Idle state, a UE can be configured to use resources associated with longer CP(s), e.g., such as the configurations in Tables 1-6, for TA free transmissions and/or small data and/or state transitions (to active state) to save UE energy and reduce latency. The resource configuration from the base station(s) can be updated either semi-statically or dynamically via by broadcast, multi-cast (e.g., group common PDCCH), RRC and/or DCI signaling. Although conventional networks may use different CP lengths (i.e., CP overhead of 6.67% and 20%), such networks do not use different CP lengths to accommodate TA free transmission. In some embodiments, longer CPs e.g., CP overheads of 46.7% and 56%, are used to accommodate to TA free transmissions.

In other embodiments, if UE is in the active/RRC connected state, the resource configurations including the CP types can be done by RRC or DCI. In another embodiment, a UE in Inactive or Idle state will listen to (e.g., time/frequency) resource configurations with different CP type(s), including possibly NCP, that are signaled by the base station(s) via broadcast and/or multi-cast signaling such as group common PDCCH, or even UE specific signaling such as RRC and DCI if feasible.

In one embodiment, a UE that is in an inactive state (e.g., an RRC energy-saving state), or in an idle state (e.g., an RRC disconnected) or long DRX off period of an active (or RRC connected) state, may perform a transmission using a longer CP length without performing a PRACH procedure to update its synchronization settings. In one embodiment, the UL transmission performed using the longer CP length carries data without an indication that the UE intends to transition to a different mode/state. In another embodiment, the UL transmission performed using the longer CP length carries an indication that the UE intends to transition to a different mode/state, where the indication information will be included in the transmitted data (in this case, it is possible that only a portion of actual full data information can be transmitted in an initial transmission packet due to per resource capability limitation). In yet another embodiment, the UL transmission performed using the longer CP length carries an indication that the UE intends to transition to a different mode/state, but does not include actual data. In each of the abovementioned embodiments, the UL transmission may be performed over resources associated with the longer CP length, e.g., resources configured for TA-free transmissions.

In some embodiments, a UE may adjust its TA settings based on knowledge of the UE's relative or absolute position in the cell/network without using PRACH process with a preamble (so still TA free). For example, a UE that is operating in Operation Mode (a) may use a sensor (e.g., GPS, accelerometer, etc.) to gauge its absolute location in the cell, or a change in the UE's relative location within the cell comparison with the previous location, and then adjust its TA settings in a manner that compensates for an estimated round-trip/propagation-delay between the UE and the serving base station. Additionally, a serving base station may also be able to determine the TA settings based on messages exchanged with the UE, and send the UE an instruction/indication to adjust the TA settings accordingly. The instructions/indication may be sent via higher layer signaling (e.g., RRC signaling), layer one signaling (e.g., DCI messages), and/or even group based (e.g., group common PDCCH). The indication may instruct the UE to use a specific TA setting/parameter for a grant-based or grant-free uplink transmission.

The number of symbols that fit within a sub-frame and/or slot may vary depending on the CP length. Table 6 indicates the number of OFDM symbols per sub-frame/slot for different sub-carrier spacings and CP length combinations, where for each subcarrier spacing (e.g., 15 kHz), one sub-frame/slot consists of different number of OFDM symbols based on CP types and lengths, for example, 12 OFDM symbols with Type A CP length, 8 OFDM symbols with Type B CP length, and 6 OFDM symbols with Type C CP length; however, each such constructed sub-frame/slot has a same period per subcarrier spacing (e.g., 1 ms for 15 hHz). Moreover, such constructed slots and their periods among scalable subcarrier spacing (e.g., 15 kHz vs 60 kHz) is inversely scaled (e.g., 1 ms vs 0.25 ms). In some embodiments, a sub-frame/slot may include mini-slots consisting of one or more symbols (but less than a total number of symbols in the slot). Note that in LTE or 15 kHz numerology with normal CP (e.g., NCP overhead of 6.7%), one sub-frame consists of 14 ODFM symbols, where one 14-symbol sub-frame has a duration of 1 ms. As a result, one slot for any sub-carrier spacing (e.g., 15 kHz SCS) can consist of 14 OFDM symbols with NCP, 12 OFDM symbols with Type-A CP, 8 OFDM symbols with Type-B CP, or 6 OFDM symbols with Type-C CP. Each of these different slot configurations may be associated with the same slot period (e.g., 1 ms for 15 kHz SCS slot). Therefore, resource configurations with different CP lengths in slots having the same subcarrier spacing (e.g., 15 kHz) can be implemented using TDM and/or FDD multiplexing and for both FDD and TDD operations. Due to the scalability characteristics of different numerologies (e.g., 15 kHz and 60 kHz SCS) with NCP and the larger CP lengths, resource configurations with different numerologies can also be made available, based on both TDM and/or FDD multiplexing and for both FDD and TDD operations.

A UE may be configured with different resources associated with normal and/or longer CP lengths, and the UE may select which resources to use for a given transmissions based on various criteria. For example, the network may configure resource 1 associated with CP length 1, and resource 2 associated with CP length 2, where CP length 1≠CP length 2; Upon traffic arrival, a UE can choose resource 1 (using CP length 1) or resource 2 (using CP length 2) for the UL transmissions without grant, where the selection is based on certain rule or criteria such as using the resource with a larger CP for reliable and low latency application, etc. In another example, a UE may initially transmit data over resources associated with a normal CP-length, and then switch to resources associated with a longer CP-length. In other examples, a UE may initially transmit data over resources associated with a longer CP-length, and then switch back to resources associated with a normal CP-length. Such UE behaviors can be pre-defined, pre-configured, and/or instantly signaled by the base station. In another embodiment, given configured PRACH channels, a UE may transmit data and a PRACH preamble separately, where the data transmission is performed over resources associated with a longer CP-length, and the PRACH preamble transmissions is performed over resources assigned to a PRACH channel where a NCP or longer CP can be employed. For a shorter PRACH preamble sequence (e.g., in one symbol) in new radio (NR) than LTE, the coverage can be a problem; in such case, a longer CP will enhance PRACH coverage and detection at the receiver. The data and PRACH preamble transmissions may be performed simultaneously or at different times. The resources over which the respective data and PRACH preamble transmissions are performed may be non-orthogonal or orthogonal in the time and/or frequency domain. In some cases, a special two-step RACH procedure is performed such that the base station need to detect and decode uplink data transmission, as well as to measure UE timing for a potential subsequent TA adjustment, where the two-step RACH here means the data and preamble over PRACH are transmitted simultaneously in TDM/FDM way, with data transmission using the resources with larger CP(s). The data transmission may or may not include reference/pilot symbols (e.g., demodulation reference symbols (DMRS), etc.). In one embodiment, a data transmission that is performed simultaneously with a PRACH preamble transmissions excludes DMRSs. In another embodiment, a data transmission that is not accompanied by a PRACH preamble transmission includes DMRSs.

TABLE 6

| SCS (kHz) | # of OFDM symbols per subframe/slot | | |
| --- | --- | --- | --- |
| | CP Type A | CP Type B | CP Type C |
| 3.75 | 12 | 8 | 6 |
| 7.5 | 12 | 8 | 6 |
| 15 | 12 | 8 | 6 |
| 30 | 12 | 8 | 6 |
| 60 | 12 | 8 | 6 |
| 120 | 12 | 8 | 6 |
| 240 | 12 | 8 | 6 |
| 480 | 12 | 8 | 6 |
| CP Overhead | 20.0% | 46.7% | 55.6% |

Figure 7:
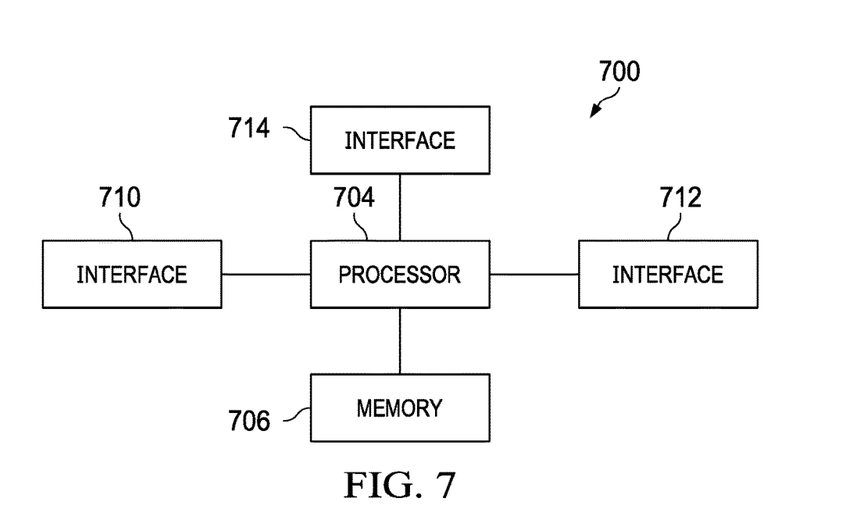
FIG. 7 is a block diagram of an embodiment processing system.

FIG. 7 is a diagram of a block diagram of an embodiment processing system 700 for performing methods described herein, which may be installed in a host device. As shown, the processing system 700 includes a processor 704, a memory 706, and interfaces 710-714, which may (or may not) be arranged as shown in FIG. 7. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
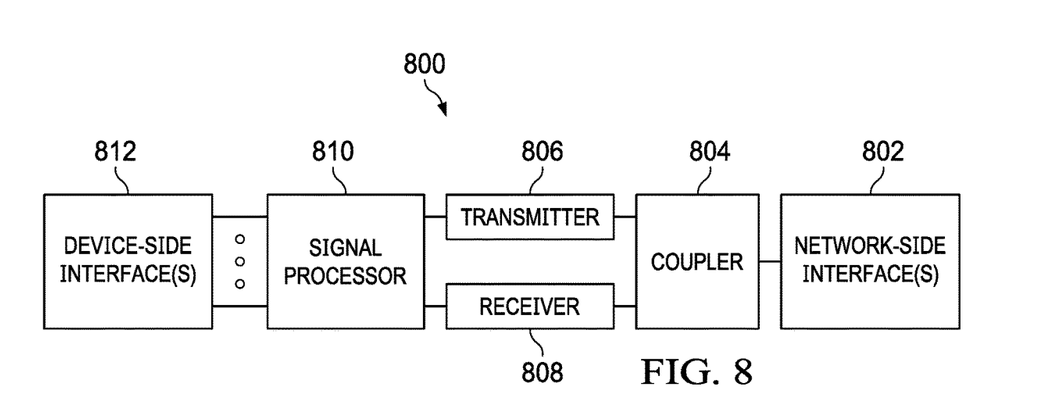
FIG. 8 is a block diagram of an embodiment transceiver.

In some embodiments, one or more of the interfaces 710, 712, 714 connects the processing system 700 to a transceiver adapted to transmit and receive signaling over the telecommunications network. FIG. 8 is a diagram of a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 600, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

What is claimed is:
1. A method comprising:
receiving, by an apparatus, a configuration instruction from a base station, the configuration instruction indicating a cyclic prefix length, the cyclic prefix length determined based on a size of a coverage area of the base station, a location of the apparatus in the coverage area of the base station, and a state of the apparatus, the state of the apparatus being one of an active state, an inactive state, or an idle state, the cyclic prefix length being one of a plurality of cyclic prefix lengths, the plurality of cyclic prefix lengths including a first cyclic prefix length and a second cyclic prefix length, the second cyclic prefix length being different from the first cyclic prefix length, the first cyclic prefix length corresponding to the active state, and the second cyclic prefix length corresponding to the inactive state or the idle state; and
performing, by the apparatus, an uplink transmission, the uplink transmission carrying a cyclic prefix having the cyclic prefix length indicated by the configuration instruction received from the base station.

2. The method of claim 1, further comprising selecting from multiple resources a resource over which to perform the uplink transmission based on the cyclic prefix length associated with the resource.

3. The method of claim 1, wherein the apparatus is in the idle state or the inactive state prior to performing the uplink transmission, and wherein a resource over which the uplink transmission is performed is configured associated with the cyclic prefix length, the resource being configured to carry uplink information transmissions of apparatuses transitioning from the idle state or the inactive state to the active state.

4. The method of claim 1, wherein a resource over which the uplink transmission is performed is associated with the cyclic prefix length, the cyclic prefix length being configured to carry timing advance (TA) free uplink transmissions.

5. The method of claim 1, the performing comprising:
performing the uplink transmission without adjusting a TA,
wherein the configuration instruction associates a different cyclic prefix length with resources configured to carry uplink transmissions by apparatuses in the active state than with resources configured to carry TA free uplink transmissions by apparatuses in the idle state or the inactive state.

6. The method of claim 1, wherein the configuration instruction is broadcast or multicast to a particular group of apparatuses.

7. The method of claim 1, further comprising:
selecting, by the apparatus, the cyclic prefix length based on an absolute or relative location of the apparatus within a serving cell.

8. The method of claim 1, wherein the uplink transmission does not include timing advance reference signaling.

9. An apparatus comprising:
at least one processor; and
a non-transitory computer readable storage medium storing programming for execution by the at least one processor, the programming including instructions to:
receive a configuration instruction from a base station, the configuration instruction indicating a cyclic prefix length, the cyclic prefix length determined based on a size of a coverage area of the base station, a location of the apparatus in the coverage area of the base station, and a state of the apparatus, the state of the apparatus being one of an active state, an inactive state, or an idle state, the cyclic prefix length being one of a plurality of cyclic prefix lengths, the plurality of cyclic prefix lengths including a first cyclic prefix length and a second cyclic prefix length, the second cyclic prefix length being different from the first cyclic prefix length, the first cyclic prefix length corresponding to the active state, and the second cyclic prefix length corresponding to the inactive state or the idle state; and
perform an uplink transmission, the uplink transmission carrying a cyclic prefix having the cyclic prefix length indicated by the configuration instruction received from the base station.

10. A method comprising:
sending, by a base station to one or more user equipments (UEs), a configuration instruction instructing the one or more UEs to transmit one or more uplink transmissions in accordance with a cyclic prefix length, the cyclic prefix length determined based on a size of a coverage area of the base station, locations of the one or more UEs in the coverage area of the base station, and one or more states corresponding to the one or more UEs, each of the one or more states being one of an active state, an inactive state, or an idle state, the cyclic prefix length being one of a plurality of cyclic prefix lengths, the plurality of cyclic prefix lengths including a first cyclic prefix length and a second cyclic prefix length, the second cyclic prefix length being different from the first cyclic prefix length, the first cyclic prefix length corresponding to the active state, and the second cyclic prefix length corresponding to the inactive state or the idle state; and
receiving, by the base station from the one or more UEs, the one or more uplink transmissions carrying a cyclic prefix having the cyclic prefix length.

11. The method of claim 10, wherein repeated timing advance (TA) reference signaling is omitted from the one or more uplink transmissions.

12. The method of claim 10, wherein the cyclic prefix length is based on a characteristic of the coverage area of the base station.

13. The method of claim 12, wherein the characteristic of the coverage area comprises a coverage area size, and wherein the configuration instruction indicates a longer cyclic prefix length when the base station has a larger coverage area than when the base station has a smaller coverage area.

14. The method of claim 12, wherein the characteristic of the coverage area comprises a multi-path time delay in the coverage area, and wherein the configuration instruction indicates a longer cyclic prefix length when the coverage area has a larger multi-path time delay than when the coverage area has a smaller multi-path time delay.

15. The method of claim 10, wherein the configuration instruction is carried in radio resource control (RRC) message.

16. The method of claim 15, wherein the configuration instruction semi-statically instructs the one or more UEs to transmit the one or more uplink transmissions in accordance with the cyclic prefix length for a predetermined amount of time or until a subsequence instruction that indicates a different cyclic prefix length is received.

17. The method of claim 10, wherein the configuration instruction is carried in downlink control indication (DCI) message.

18. The method of claim 17, wherein the configuration instruction dynamically instructs the one or more UEs to transmit the one or more uplink transmissions in accordance with the cyclic prefix length for a specific resource.

19. A base station comprising:
at least one processor; and
a non-transitory computer readable storage medium storing programming for execution by the at least one processor, the programming including instructions to:
send a configuration instruction to one or more user equipments (UEs), the configuration instruction instructing the one or more UEs to transmit one or more uplink transmissions in accordance with a cyclic prefix length, the cyclic prefix length determined based on a size of a coverage area of the base station, locations of the one or more UEs in the coverage area of the base station, and one or more states corresponding to the one or more UEs, each of the one or more states being one of an active state, an inactive state, or an idle state, the cyclic prefix length being one of a plurality of cyclic prefix lengths, the plurality of cyclic prefix lengths including a first cyclic prefix length and a second cyclic prefix length, the second cyclic prefix length being different from the first cyclic prefix length, the first cyclic prefix length corresponding to the active state, and the second cyclic prefix length corresponding to the inactive state or the idle state; and
receive the one or more uplink transmissions carrying a cyclic prefix having the cyclic prefix length.

20. The base station of claim 19, wherein repeated timing advance (TA) reference signaling is omitted from the one or more uplink transmissions.

21. The method of claim 1, wherein the configuration instruction received via semi-static signaling, and the uplink transmission is a grant-free uplink transmission.

22. The method of claim 1, wherein the cyclic prefix length is determined further based on at least one of a type of the coverage area of the base station, a multi-path delay associated with the coverage area of the base station, or a traffic type of the coverage area of the base station.

23. The method of claim 10, wherein the cyclic prefix length is such that the one or more uplink transmissions are communicated without adjusting a TA to compensate for different propagation delays between the one or more UEs and the base station.

\* \* \* \* \*